Nov. 5, 1963  B. POLOVTSEFF ET AL  3,109,767
COMPOSITE BOARD AND METHOD OF MAKING SAME
Filed Oct. 24, 1960
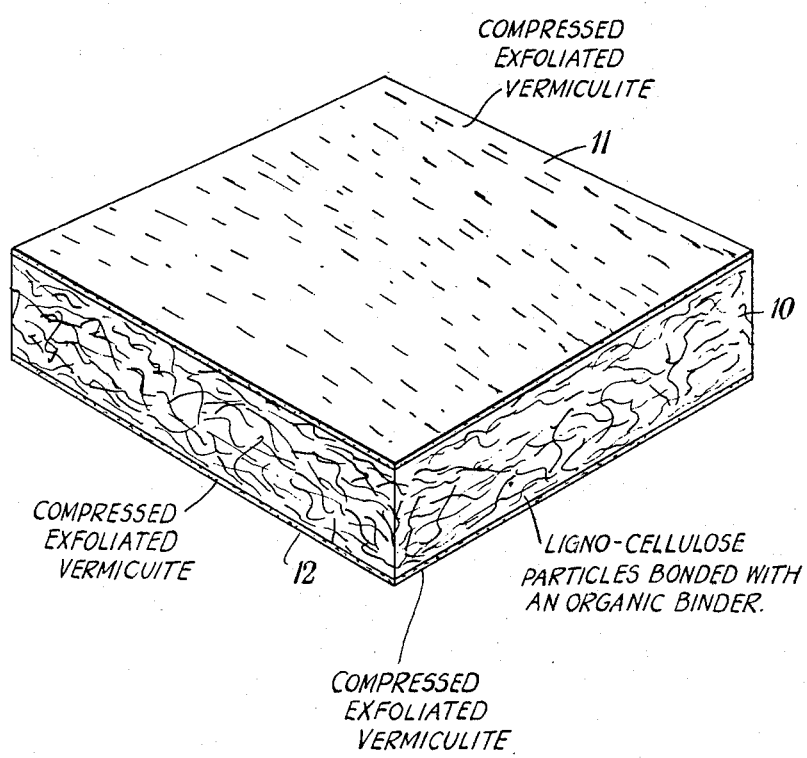

3,109,767
COMPOSITE BOARD AND METHOD OF MAKING SAME
Boris Polovtseff, 165 Almners Road, Lyne, and David Allan, 28 Dickens Drive, Addlestone, both of Surrey, England, and Frederick Everrett Childs, Lingholm, Blackheath, England
Filed Oct. 24, 1960, Ser. No. 64,262
10 Claims. (Cl. 161—163)

This invention relates to composite board material and more particularly, to the material known as "particle board," which consists of ligno-cellulosic particles bonded with synthetic resin or other organic binder. The ligno-cellulosic particles may be wood chips, in which case the particle board is also known as "wood chipboard." In general, however, particle board may contain other ligno-cellulosic materials such as bagasse or bamboo.

The invention aims at providing a composite board of pleasing appearance which has a high degree of fire-resistance and other valuable properties.

With the foregoing and other objects in view, the present invention provides a composite board which consists of a particle board provided on one or both sides with an integral layer of exfoliated vermiculite.

The invention also provides a method of making a composite board, wherein a particle board is provided on one or both sides with an integral surface layer of exfoliated vermiculite.

In one method of carrying out the invention, exfoliated vermiculite is mixed with an adhesive and thereupon spread out in a layer in the bottom of a suitable mould. A layer of a mixture of wood chips and synthetic resin adhesive is thereupon spread over the layer of vermiculite in the form of the usual mattress, whereafter the assembly is pressed and cured in the normal manner to form a wood chipboard provided on one side with a fireproof layer of exfoliated vermiculite. If desired, a film of adhesive may be interposed between the layer of vermiculite and the wood chips.

If desired, after the mattress of wood chips and adhesive has been built up on the layer of exfoliated vermiculite and adhesive, the wood chip mattress may be covered with a further layer of exfoliated vermiculite, with or without the intervention of a film of adhesive, after which the assembly is subjected to heat and pressure in the usual way, to form a wood chipboard provided on both sides with a fireproof layer of exfoliated vermiculite or the like.

When the composite board according to the present invention is exposed to fire or flame, the layer of vermiculite acts as a non-inflammable heat-insulating impervious membrane excluding the supply of oxygen to the combustible matter of the board.

The composite board of the present invention can be painted, covered with metal foil or otherwise surface treated.

The fire resistance, hardness, abrasion resistance, appearance and water resistance of the composite boards of the present invention can be improved by the application of an adhesive to the outer layer or layers of exfoliated micaceous material during manufacture of the board. The adhesive also improves the texture of the outer layers and makes them smoother and more suitable for painting or other finishing operations.

The adhesive, which is preferably a synthetic resin adhesive, may first be sprayed onto the mould in which the composite board is made, and also onto the surface of the top layer of exfoliated vermiculite in the case where a board provided on both sides with a layer of exfoliated vermiculite is to be made.

The synthetic resin adhesive may be applied in the form of liquid the composition and viscosity of which may be varied to suit operational requirements, or may be applied in the form of a film. Furthermore, accelerating or retarding agents may be included in the resin adhesive composition, and fillers or additives may be added to the resin adhesive composition for the purpose of providing decorative effects or other desirable surface effects.

Preferred synthetic resin adhesive compositions are those based on formaldehyde, such as, for example, urea formaldehyde and melamine formaldehyde resins.

In an alternative method of carrying out the invention, a layer of exfoliated vermiculite mixed with adhesive is applied to one or both sides of a ready made particle board with or without the interposition of a film of adhesive and with or without the application of an outer layer of synthetic resin adhesive, and thereupon pressed and cured so as to become integral with the finished board. The pressure or compression referred to in the claims is of the order of 250 lbs. per sq. in.

The invention will be illustrated by the following examples:

Example 1

Exfoliated vermiculite is mixed with urea formaldehyde adhesive in the proportions of 16 ozs. exfoliated vermiculite (commercially known as Grade 2 size) and 1 oz. urea formaldehyde adhesive (containing approximately 50% Solids). Approximately 8 ozs. of this mixture is evenly distributed on an aluminium caul plate approximately 2′0″ x 1′6″. On this layer is evenly built up a wood chip-resin mixture consisting of 8 lb. softwood chips mixed with 27 oz. urea formaldehyde resin adhesive, covered with a film of adhesive known under the registered trademark "Tego."

A further layer of exfoliated vermiculite, prepared as previously described, is evenly distributed over this mattress and covered with a second aluminium caul plate. The whole mattress, including the caul plate (with distance pieces or spacing blocks to produce a ¾″ thick board) is placed in a hydraulic press with heated platens at a temperature of 140° C. and a compressing pressure of 250 lb. per square inch applied for fifteen minutes. At the end of this time the completed vermiculite-surfaced wood chipboard 2′0″ x 1′6″ x ¾″ is removed from the press.

Example 2

A synthetic resin adhesive composition (comprising 40 parts by weight of urea-formaldehyde resin having a solids content of approximately 70%, 50 parts by weight of water, and 10 parts by weight of paraffin wax emulsion of approximately 30% solids content) is sprayed evenly on to an aluminium caul plate approximately 12 ft. x 6 ft., 25 ozs. being uniformly distributed over the caul plate. 12 lbs. of exfoliated vermiculite mixed with 12 ozs. urea-formaldehyde resin (having a solids content of approximately 50%) is then evenly spread on the sprayed caul plate, followed by 192 lbs. of softwood chips mixed with 40 lbs. of urea-formaldehyde resin adhesive (having a solids content of approximately 50%). A further layer of 12 lbs. of exfoliated vermiculite mixed with 12 ozs. of urea-formaldehyde resin is spread over this mattress, and 30 ozs. of the synthetic resin adhesive composition is sprayed on to this layer of vermiculite. The whole is covered with a second aluminium caul plate, and the assembly is placed in a hydraulic press with platens heated to 140° C. and compressed at a pressure of 250 lbs. per square inch for 15 minutes to a thickness of ¾″. At the end of this time the completed vermiculite surfaced wood chipboard with improved surfaces and having dimensions of 12′ x 6′ x ¾″, is removed from the press.

Example 3

25 ozs. of melamine-formaldehyde resin (having a solids content of approximately 50%) are sprayed evenly onto an aluminum caul plate, approximately 12 ft. x 6 ft. 12 lbs. of exfoliated vermiculite mixed with 12 ozs. of urea-formaldehyde resin (having a solids content of approximately 50%) are then spread evenly on the sprayed caul plate, followed by 192 lbs. of softwood chips, mixed with 40 lbs. of urea-formaldehyde resin (having a solids content of approximately 50%). The whole is covered with a second aluminium caul plate and the assembly is placed in a hydraulic press with platens heated by steam to 140° C. and compressed under a pressure of 250 lbs. per square inch for 15 minutes to a thickness of ¾". At the end of this time the wood chipboard with one reinforced vermiculate fire resistant surface is removed from the press.

The single FIGURE of the drawing shows a piece of the laminated board. The same is shown as comprised of a thick layer 10 of ligno-cellulosic particles bonded with an organic binder, in accordance with the invention, coated on both faces with compressed exfoliated vermiculate layers 11 and 12.

What is claimed is:

1. A composite board, comprising a particle board consisting of ligno-cellulosic particles bonded with an organic binder, and on at least one side of said particle board a layer of compressed exfoliated vermiculite integral therewith.

2. A composition board as claimed in claim 1, wherein an outer layer of synthetic resin is integrally bonded with the exfoliated vermiculite.

3. A method of making a composite board comprising the steps of spreading on the bottom half of moulding means in which the board is to be prepared a layer comprising a mixture of exfoliated vermiculite and a synthetic resin, spreading on said layer a layer of ligno-cellulosic particles bonded with synthetic resin, and subjecting the two layers to heat and pressure thereby to form a composite board with one integral layer of exfoliated vermiculite.

4. A method as claimed in claim 3, wherein the bottom half of the pressing means is coated with a synthetic resin prior to the spreading thereon of the mixture of exfoliated vermiculite and synthetic resin.

5. A method of making a composite board, comprising the steps of spreading a mixture of exfoliated vermiculite and synthetic resin on the bottom half of pressing means in which the board is to be prepared, spreading on such layer a mattress of wood chips mixed with a synthetic resin binder, spreading on the mattress of wood chips a further layer of exfoliated vermiculite and synthetic resin, and subjecting the three layers to heat and pressure thereby to form a composite board with two integral layers of exfoliated vermiculte.

6. A method as claimed in claim 5, wherein a film of synthetic resin is interposed between the surface of the mattress and the upper layer of the vermiculite-synthetic resin mixture.

7. A method of making a composite board, comprising the steps of applying a layer of exfoliated vermiculite mixed with synthetic resin to at least one side of a ready made particle board, and then subjecting the thus coated particle board to heat and pressure to render the mixture of exfoliated vermiculite and synthetic resin integral with the particle board.

8. A method of making a composite board comprising the steps of spraying evenly onto a caul plate a synthetic resin composition from the group consisting of urea-formaldehyde resin and melamine-formaldehyde resin, spreading on the sprayed caul plate a mixture of exfoliated vermiculite and a synthetic resin selected from the group consisting of urea-formaldehyde resin and melamine-formaldehyde resin, spreading on the layer comprising exfoliated vermiculite a layer of softwood chips mixed with a synthetic resin binder selected from the group consisting of urea-formaldehyde resin and melamine-formaldehyde resin, spreading on the layer comprising the softwood chips a further layer of exfoliated vermiculite mixed with said resin, spraying said layer comprising the exfoliated vermiculite with a synthetic resin composition selected from the group consisting of urea-formaldehyde resin and melamine-formaldehyde resin, covering the superposed layers with a second caul plate, and subjecting the superposed layers between the caul plates to a pressure of about 250 lbs. per square inch and a temperature of about 140° C. for about 15 minutes to form a composite board having on each side an integral layer of exfoliated vermiculite.

9. A method of making a composite board comprising placing on a plate, a spacing block, placing on said plate exfoliated vermiculite with a binding material therein, placing a mattress of ligno-cellulosic particles on said vermiculite, placing another plate on said mattress and subjecting the assembly to heat and pressure sufficient to compress the means between the plates to the thickness of the spacing block.

10. A method as in claim 9 wherein an additional quantity of exfoliated vermiculite is spread over the mattress prior to covering the mattress with the second plate.

References Cited in the file of this patent

UNITED STATES PATENTS

| | | |
|---|---|---|
| 1,972,390 | Miner | Sept. 4, 1934 |
| 2,037,294 | Williamson | Apr. 14, 1936 |
| 2,462,255 | Charman et al. | Feb. 22, 1949 |
| 2,642,371 | Fahrni | June 16, 1953 |
| 2,965,532 | Taylor | Dec. 20, 1960 |

FOREIGN PATENTS

| | | |
|---|---|---|
| 789,929 | Great Britain | Jan. 29, 1958 |